US007764817B2

(12) United States Patent (10) Patent No.: US 7,764,817 B2
Georgescu et al. (45) Date of Patent: Jul. 27, 2010

(54) METHOD FOR DATABASE GUIDED SIMULTANEOUS MULTI SLICE OBJECT DETECTION IN THREE DIMENSIONAL VOLUMETRIC DATA

(75) Inventors: Bogdan Georgescu, Plainsboro, NJ (US); Xiang Zhou, Exton, PA (US); Wei Hong, Champaign, IL (US); Dorin Comaniciu, Princeton Junction, NJ (US); Sriram Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1021 days.

(21) Appl. No.: 11/502,709

(22) Filed: Aug. 10, 2006

(65) Prior Publication Data

US 2007/0036414 A1 Feb. 15, 2007

Related U.S. Application Data

(60) Provisional application No. 60/708,202, filed on Aug. 15, 2005.

(51) Int. Cl.
*G06K 9/00* (2006.01)
*G06K 9/62* (2006.01)
*G06K 9/46* (2006.01)
*G06K 9/66* (2006.01)
*G06K 9/32* (2006.01)

(52) U.S. Cl. .................. 382/128; 382/131; 382/154; 382/155; 382/159; 382/181; 382/190; 382/216; 382/294

(58) Field of Classification Search .............. 382/128, 382/131, 12, 154, 155, 159, 181, 190, 203, 382/209, 216, 217, 225, 294, 132; 703/2, 703/11
See application file for complete search history.

(56) References Cited

U.S. PATENT DOCUMENTS

| 6,106,466 | A  | * | 8/2000 | Sheehan et al. | 600/443 |
| 6,545,678 | B1 | * | 4/2003 | Ohazama | 345/427 |
| 6,751,363 | B1 | * | 6/2004 | Natsev et al. | 382/305 |
| 7,043,474 | B2 | * | 5/2006 | Mojsilovic et al. | 707/6 |
| 7,200,251 | B2 | * | 4/2007 | Joshi et al. | 382/128 |
| 7,225,011 | B2 | * | 5/2007 | Mielekamp | 600/407 |
| 7,421,122 | B2 | * | 9/2008 | Kaus et al. | 382/173 |
| 7,529,394 | B2 | * | 5/2009 | Krishnan et al. | 382/128 |
| 2002/0102024 | A1 | * | 8/2002 | Jones et al. | 382/225 |
| 2003/0013951 | A1 | * | 1/2003 | Stefanescu et al. | 600/407 |
| 2003/0174872 | A1 | * | 9/2003 | Chalana et al. | 382/128 |

(Continued)

OTHER PUBLICATIONS

Viola, et al. "Rapid Object Detection using a Boosted Cascade of Simple Features." Computer Vision and Pattern Recognition, 2001. CVPR 2001.. 1. (2001): 511-518. Print.*

(Continued)

*Primary Examiner*—Matthew C Bella
*Assistant Examiner*—Michael A Newman

(57) ABSTRACT

The present invention is directed to a method for automatic detection and segmentation of a target anatomical structure in received three dimensional (3D) volumetric medical images using a database of a set of volumetric images with expertly delineated anatomical structures. A 3D anatomical structure detection and segmentation module is trained offline by learning anatomical structure appearance using the set of expertly delineated anatomical structures. A received volumetric image for the anatomical structure of interest is searched online using the offline learned 3D anatomical structure detection and segmentation module.

20 Claims, 14 Drawing Sheets

U.S. PATENT DOCUMENTS

2005/0010445 A1*  1/2005  Krishnan et al. ............... 705/2
2005/0169517 A1*  8/2005  Kasai ......................... 382/159

OTHER PUBLICATIONS

Shyu, et al. "Assert: A Physician-in-the-Loop Content-Based Retrieval System for HRCT Image Databases." Computer Vision and Image Understanding. 75.1/2 (1999): 111-132. Print.*

Liu et al. "Classification Driven Semantic Based Medical Image Indexing and Retrieval." The Robotics Institute Carnegie Mellon University. (1998).*

Declerck et al. "Automatic Retrieval of Anatomical Structures in 3D Medical Images." Proc. Of the Conf. On Comp. Vis., Virtual Reality, and Rob. In Med. (1995).*

* cited by examiner

METHOD FOR DATABASE GUIDED SIMULTANEOUS MULTI SLICE OBJECT DETECTION IN THREE DIMENSIONAL VOLUMETRIC DATA

CROSS REFERENCE TO RELATED APPLICATIONS

This application claims the benefit of U.S. Provisional Application Ser. No. 60/708,202, filed on Aug. 15, 2005, which is incorporated by reference in its entirety.

FIELD OF THE INVENTION

The present invention is directed to a method for database-guided simultaneous multi-slice object detection in three dimensional (3D) volumetric data, and more particularly, to a method for detecting an anatomical structure, such as a left ventricle, from 3D medical imaging data.

BACKGROUND OF THE INVENTION

It is very common during medical examinations for medical imaging systems (e.g., ultrasound imaging systems) to be used for the detection and diagnosis of abnormalities associated with anatomical structures (e.g., organs such as the heart). Many times, the images are evaluated by a medical expert (e.g., a physician or medical technician) who is trained to recognize characteristics in the images which could indicate an abnormality associated with the anatomical structure or a healthy anatomical structure.

Various types of approaches have been used to detect objects of interest (e.g., anatomical structures). Component-based object detectors can deal with large variations in pose and illumination, and are more robust under occlusions and heteroscedastic noise. For example, in echocardiogram analysis, local appearance of the same anatomical structure (e.g., the septum) is similar across patients, while the configuration or shape of the heart can be dramatically different due to, for example, viewing angles or disease conditions Due to its availability, relative low cost, and noninvasiveness, cardiac ultrasound images are widely used for assessing cardiac functions. In particular, the analysis of ventricle motion is an efficient way to evaluate the degree of ischemia and infarction. Segmentation or detection of the endocardium wall is the first step towards quantification of elasticity and contractility of the left ventricle. Examples of some existing methods include pixel-based segmentation/clustering approaches (e.g., Color Kinesis), variants of optical flow, deformable templates and Markov random process/fields, and active contours/snakes. The methods are employed in 2-Dimensional, 3-Dimensional or 4-Dimensional (3D+time) space.

Segmentation of anatomical structures has been traditionally formulated as a perceptual grouping task and solved through clustering and variational approaches. However, such strategies require a priori knowledge to be explicitly defined in the optimization criterion (e.g., "high-gradient border", "smoothness" or "similar intensity or texture"). These approaches are limited by the validity of the underlying assumptions and cannot capture complex structure appearance.

Accurate localization of complex structures is important in many computer vision applications ranging from facial feature detection to segmentation of anatomical structures in medical images or volumes. Availability of large databases with expert annotation of the interest structures makes a learning approach more attractive than classical approaches of solving perceptual grouping tasks through clustering or variational formulations. This is especially important when the underlying image structure does not have clear border definition, show complex appearance with large amounts of noise, or when there is a relatively large variation between expert's own annotations.

Segmentation is one of the most important low level image processing methods and has been traditionally approached as a grouping task based on some homogeneity assumption. For example, clustering methods have been used to group regions based on color similarity or graph partitioning methods have been used to infer global regions with coherent brightness, color and texture. Alternatively, the segmentation problem can be cast in an optimization framework as the minimization of some energy function. Concepts such as "high-gradient border", "smoothness" or "similar intensity or texture" are encoded as region or boundary functionality in the energy function and minimized through variational approaches.

However, as the complexity of targeted segmentation increases, it is more difficult to encode prior knowledge into the grouping task. Furthermore, it is computationally expensive to detect an anatomical structure in a 3D image directly. Learning has become more important for segmentation and there are methods that infer rules for the grouping process that are conditioned by the user input.

Automatic delineation of anatomical structures in 3D volumetric data is a challenging task due to the complexity of the object appearance as well as the quantity of information to be processed. While 3D volumetric data contains much richer information than 2D images, 3D volumetric data is still not widely used in clinical diagnosis mainly because quantitative analysis by humans is more time-consuming than analyzing 2D images. There is a need for a method which directly exploits expert annotation of the interest structure in large databases by formulating the segmentation as a learning problem.

SUMMARY OF THE INVENTION

The present invention is directed to a method for automatic detection and segmentation of a target anatomical structure in received three dimensional (3D) volumetric medical images using a database of a set of volumetric images with expertly delineated anatomical structures. A 3D anatomical structure detection and segmentation module is trained offline by learning anatomical structure appearance using the set of expertly delineated anatomical structures. A received volumetric image for the anatomical structure of interest is searched online using the offline learned 3D anatomical structure detection and segmentation module.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for database-guided simultaneous multi-slice object detection in three dimensional (3D) volumetric data. An example where such a method would be utilized is for to detecting regional wall motion abnormalities in the heart by detection and segmentation of the ventricle endocardial or epicardial borders through machine learning, or classification, and by identifying similar cases from annotated databases. It is to be understood by those skilled in the art that the present invention may be used in other applications where shape detection is useful such as, but not limited to, recognizing human features such as facial features or other body features. The present invention can also be used in medical analysis of anatomical structures such as the heart, lungs or tumors, which can be evolving over time.

The present invention is directed to a method for 3D database-guided segmentation that directly exploits expert annotation of the anatomical structure in a large database. The 3D learning problem is transformed into several 2D learning problems that are solved simultaneously. By cutting multiple 2D slices to represent a 3D shape, the segmentation in 3D is extremely accelerated. Haar-like rectangle features are used for appearance representation because they can be evaluated rapidly in 2D by using integral images. The 2D features simultaneously obtained from all of the 2D slices are used to solve two 3D learning problems: 1. Shape detection, where a classifier is trained to distinguish between object appearance and non-object appearance and 2. Shape inference, where the association between an object appearance and its 3D shape is solved by selecting the relevant features.

The multiple slices of all 3D shapes must be cut consistently according to their local coordinate system. The local coordinates of each shape will be put in correspondence through shape alignment. Alignment of two 3D shapes is in general a very hard problem because the meshes annotated by experts do not have pairwise correspondence. The present invention identifies some landmarks such as the principal axis and a representative plane (denoted by the A4C plane) about the object of interest.

Figure 1:
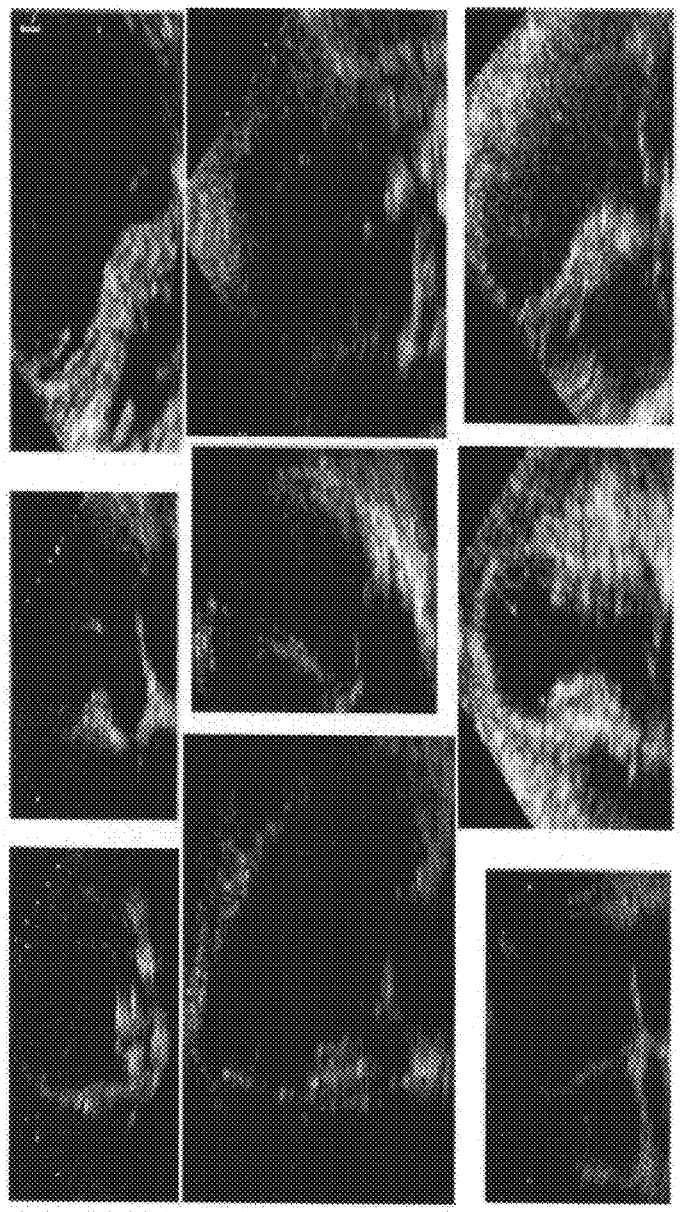
FIG. 1 illustrates ultrasound heart images that depict large variations in shape and appearance of the left ventricle.
Figure 2:
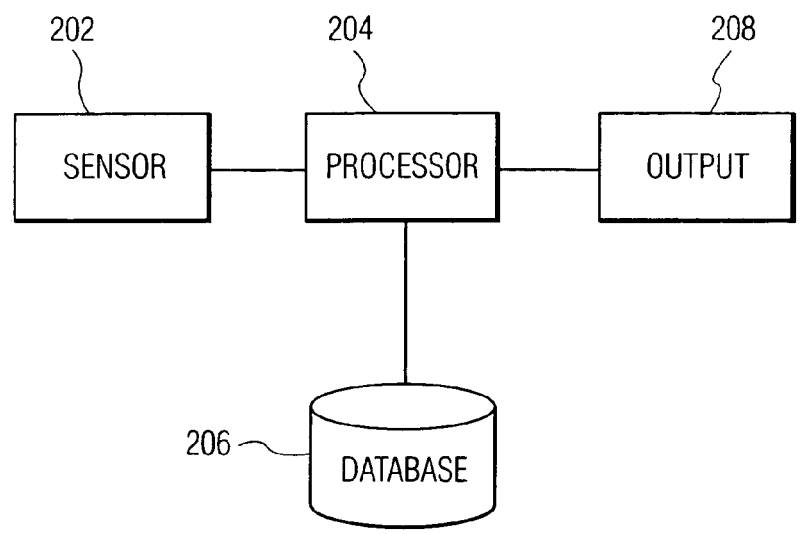
FIG. 2 illustrates an exemplary architecture of an echocardiograph system that uses a method for detecting and tracking the shape of an endocardial wall of a left ventricle in accordance with the present invention.

For purposes of describing the present invention, an example will be described for database-guided detection of the endocardial wall of the left ventricle of a human heart. The present invention can also be used for database-guided shape inference of the endocardium. FIG. 2 illustrates an exemplary architecture of an echocardiograph system that uses a method for detecting an endocardial wall of a left ventricle using shape and appearance in accordance with the present invention. A medical sensor 202, such as an ultrasound transducer is used to perform an examination on a patient. The sensor 202 is used to obtain medical measurements consistent with a particular medical examination. For example, a patient experiencing heart problems may have an echocardiogram performed to help diagnose the particular heart ailment. An ultrasound system provides images of the heart from various perspectives.

The information obtained by the sensor 202 is communicated to a processor 204 which may be a workstation or personal computer. The processor 204 converts the sensor data into an image that is communicated to display 208. The display 208 may also communicate other graphical information or tables of information relating to the image. In accordance with the present invention, the processor 204 is also provided with data representing an initial contour of the endocardial wall. The data may be provided manually by a user such as a physician or sonographer, or automatically by the processor 204. The contour comprises a series of individual points, the movement of which is tracked by the processor 204 and illustrated on display 208.

In addition to data from the medical sensor 202, the processor 204 may also receive other data inputs. For example, the processor may receive data from a database 206 associated with the processor 204. Such data may include subspace models that represent potential contour shapes for the endocardial wall. These subspace models may be images of left ventricles that are representative of a plurality of patients or may be computer generated models of contour shapes based on statistical information. The processor 204 tracks the individual points of the contour shape using known approaches such as Bayesian kernel matching or optical flow-based methods. Error accumulation during tracking is remedied by using a multi-template adaptive matching framework. Uncertainty of tracking is represented at each point in the form of a covariance matrix, which is subsequently fully exploited by a subspace shape constraint using a non-orthogonal projection.

The present invention uses a learning based approach which directly exploits expert annotation of interest structures in large medical databases. In accordance with the present invention, 3D data is cut into several slices cut along or perpendicular to the principal axis of the anatomical structure (e.g., left ventricle). The slices contain most of the information of the 3D data but can be processed much more efficiently than trying to process the entire volume.

As part of the learning based approach a training set of 3D volumes of left ventricles is used. Each image in the training set is annotated as a 3D mesh by an expert, such as a physician. The mesh can be represented by a set of points or vertices that are denoted as $P^0 = \{X_i = [X_i, Y_i, Z_i]^T \in R^3\}_{i=1}^N$ in world coordinates. N is the number of vertices of each mesh. For each point X on a shape, the corresponding point on the prototype shape is $x \in R^3$ in its local coordinates. The prototype shape is denoted as $P = \{x_i = [x_i, y_i, z_i]^T \in R^3\}_{i=1}^N$. The mean shape is denoted as $$\overline{P} \doteq \{\overline{x}_i = [\overline{x}_i, \overline{y}_i, \overline{z}_i]^T \in \mathcal{R}^3\}_{i=1}^N = \frac{1}{M} \sum P_j.$$

Figure 3A:
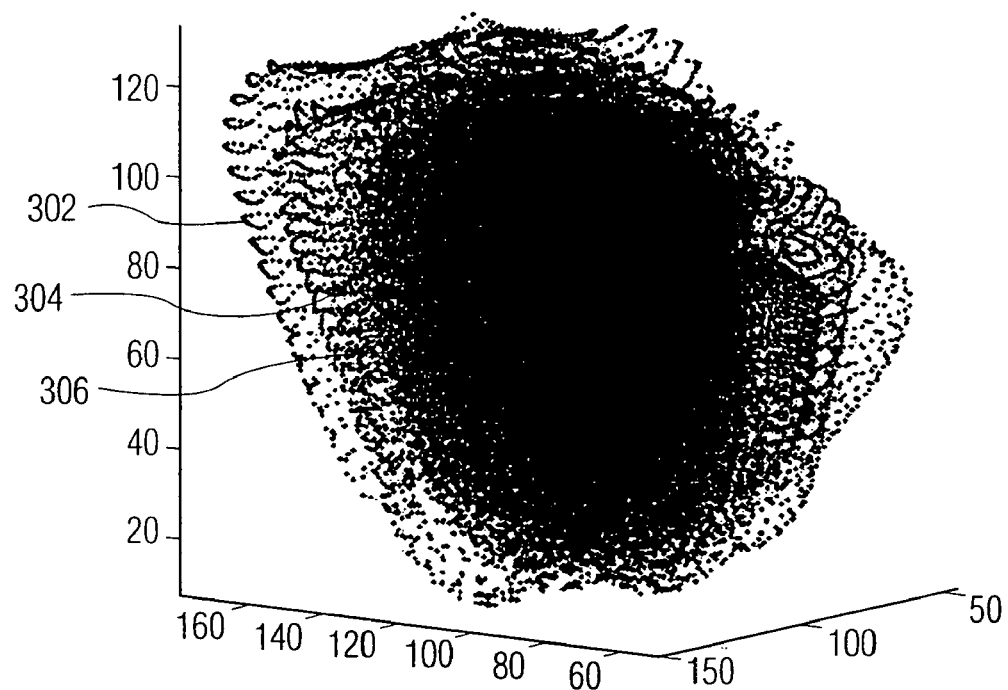
FIGS. 3(a)-3(d) illustrate 3D meshes of left ventricle volume data in accordance with the present invention.
Figure 3B:
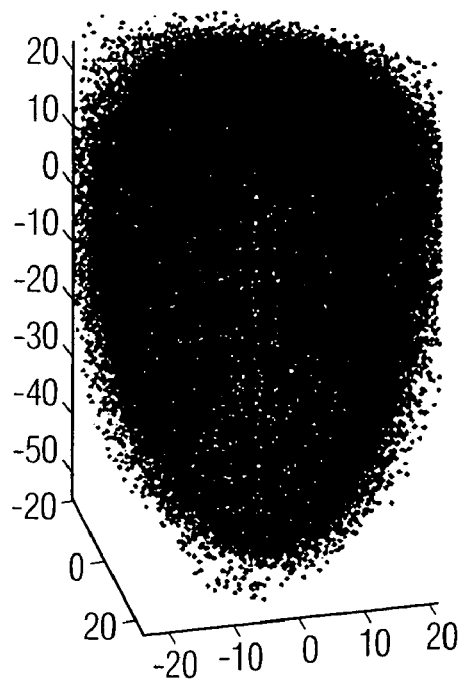
Figure 3C:
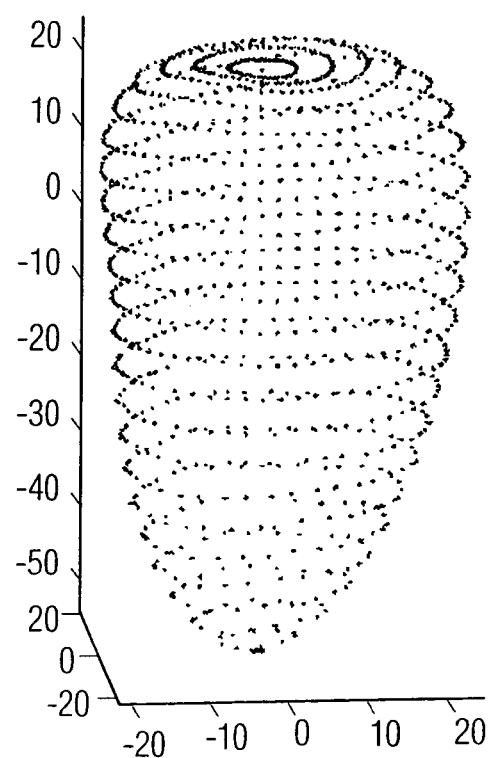
Figure 3D:
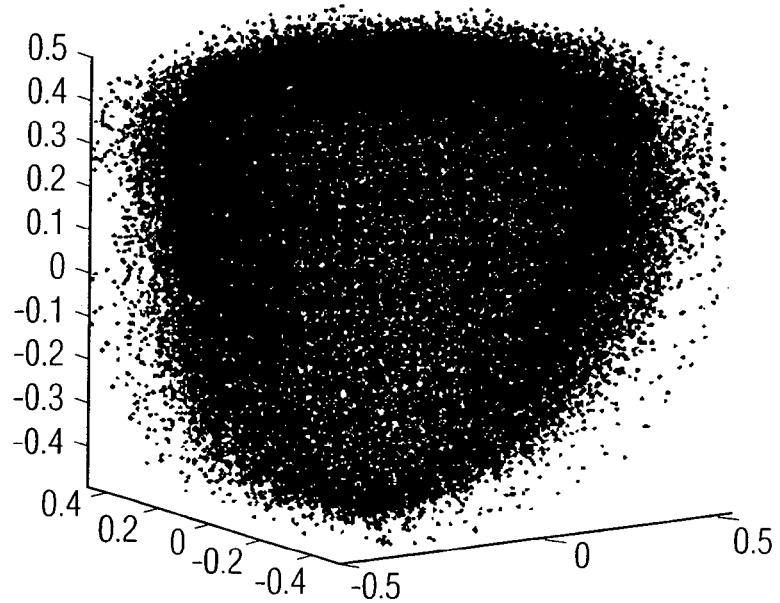

The location, orientation, size, aspect ratio, and non-linear deformation of all the meshes vary dramatically for all the training data as illustrated in FIG. 3(a). The variation among these shapes must be eliminated to acquire their essential common characteristics and build their local coordinates. The meshes 302-306 must be aligned to a mean shape to reduce the variance of the training set. The mean shape is the average of all training shapes after alignment. The 3D shape alignment comprises two steps. First, each mesh is rotated so that its principal axis is aligned to the z axis. Second, each mesh is translated and scaled so that the $L_2$ distance among all the meshes is minimized. The alignment result is shown in FIG. 3(b) and the mean shape is shown in FIG. 3(c). Finally, the mean shape is normalized into a unit size bounding box and all the meshes are scaled accordingly as shown in FIG. 3(d).

Figure 4:
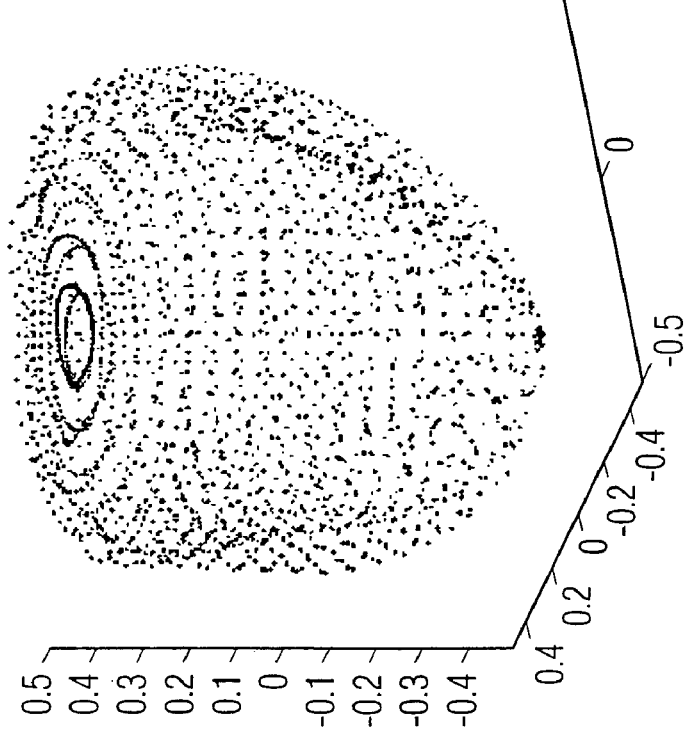
FIG. 4 illustrates the transform between the normalized aligned mesh and its original version in accordance with the present invention.
Figure 4:
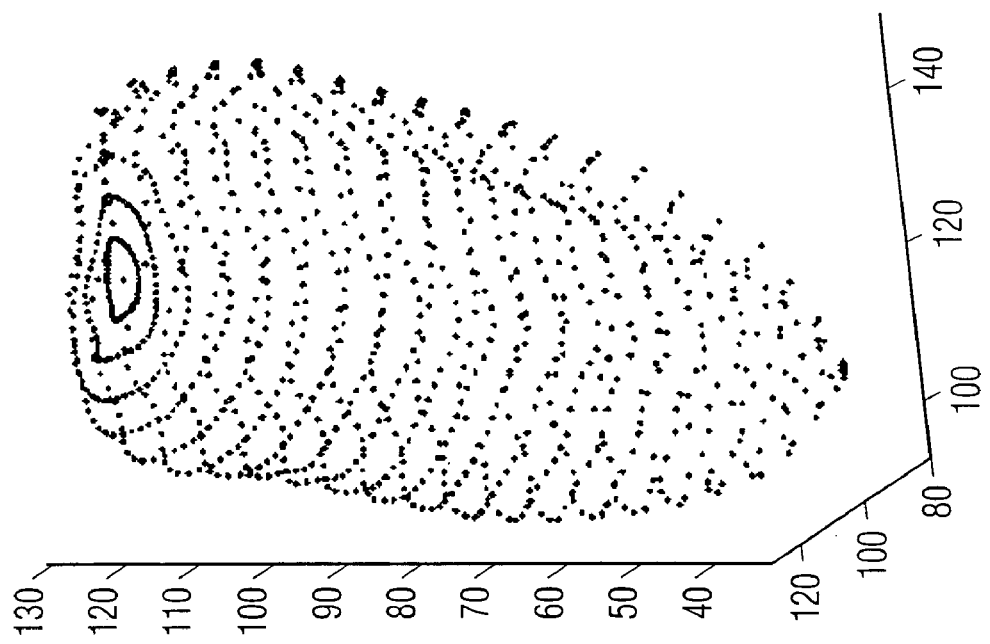

Among all the linear transformations, it is assumed that each shape is transformed to a prototype shape by rotating, translating, scaling and changing of aspect ratio. The transformation between a normalized aligned mesh and its original version can be described as:

$$X = RSx + T \quad (1)$$

$$x = R^{-1} S^{-1} (X - T) \quad (2)$$

where x is the coordinates of a vertex on the normalized aligned mesh and X is the coordinates of a vertex on the original mesh. $R \in SO(3)$ is the rotation matrix, $S = \text{diag}[w, d, h] \in R^{3 \times 3}$ is a scaling matrix and $T = [t_x, t_y, t_z]^T \in R^3$ is a translation vector. FIG. 4 illustrates the transform between the normalized aligned mesh and its original version.

For each of the samples in the training set, the parameters of the transformation have to be estimated. A total of 9 parameters are needed to represent such a linear transformation, i.e., 3 parameters for R, 3 parameters for S and 3 parameters for T. In one exemplary data set, w and d are roughly equal. Therefore, it can be assumed that w=d to reduce the total number of parameters to 8. The aspect ration of the shape is defined by h/w.

If the vertices of two shapes have pairwise correspondence, the distance of two shapes is defined as $$\text{dist}(P_1, P_2) \doteq \sum_{i=1}^N \|x_i^1 - x_i^2\| \quad (3)$$

The problem of aligning all the shapes can be written as the following optimization problem:

$$\{\overline{P}, R_j, S_j, T_j\}_{j=1}^M \doteq \operatorname{argmin} \sum_{j=1}^M \text{dist}(P_j, \overline{P}) = \sum_{j=1}^M \sum_{i=1}^N \|x_i^j - \overline{x}_i\| \quad (4)$$

Figure 12:
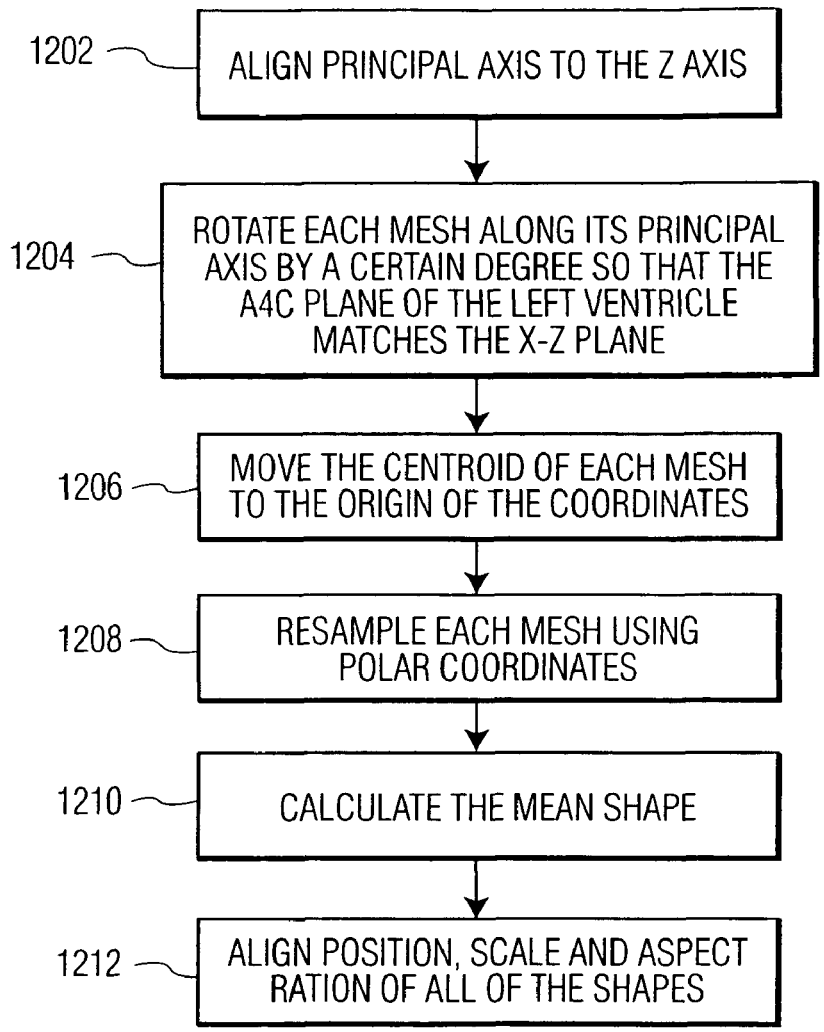
FIG. 12 is a flow chart that illustrates an iterative method for aligning shapes in accordance with the present invention.

In accordance with the present invention, an iterative linear method is used to solve the optimization problem which will now be described with reference to FIG. 12. For purposes of explanation the method will be described for the case of aligning left ventricles. For a given left ventricle, the principal axis which links two apexes of the shape is aligned to the z axis (step 1202). For each shape, the rotation matrix $R_a$ needed for this transformation is, $$R_a \doteq R_2 R_1^T, R_1 = [v, w, v \times w], R_2 = [u, w, u \times w], w = v \times u \quad (5)$$

where u is the normalized principal axis vector and $v = [0, 0, 1]^T$.

At this point, all the shapes have different angles of rotation along the z axis. For each shape of a left ventricle, the A4C plane can determine the rotation along the z axis. Next, each mesh is rotated along its principal axis by a certain degree so that the A4C plane of the left ventricle matches the x-z plane (step 1204). The rotation is denoted as $R_z$, $$R_z \doteq \begin{bmatrix} \cos\theta & \sin\theta & 0 \\ -\sin\theta & \cos\theta & 0 \\ 0 & 0 & 1 \end{bmatrix} \quad (6)$$

where θ is the angle between the A4C plane and the x-z plane. The estimated rotation matrix of each shape should be $R = R_a * R_z$.

For all meshes annotated by experts, the vertices do not have one-to-one correspondence between two meshes except the two apexes. The points of the shape should correspond to the same physical points of the left ventricle. However, it is impossible to determine automatically which points correspond to the same physical points. So after the orientation of each mesh is aligned, the centroid of each mesh is moved to the origin of the coordinates (step 1206). Next, each mesh is roughly evenly re-sampled using polar coordinates (step 1208). The re-sampled points will approximately have pairwise correspondences.

Next the mean shape $\overline{P}$ is calculated by $\overline{P} \doteq 1/M \Sigma P_j$. (step 1210). Finally, the position, scale and aspect ratio of all the shapes needs to be aligned (step 1212). For each shape, the parameters of S and T can be determined by solving the following equation $$\begin{bmatrix} \sum_{i=1}^N (x_i^2 + y_i^2) & 0 & \sum_{i=1}^N (x_i + y_i) & 0 & 0 \\ 0 & \sum_{i=1}^N z_i^2 & 0 & 0 & \sum_{i=1}^N z_i \\ \sum_{i=1}^N x_i & 0 & N & 0 & 0 \\ \sum_{i=1}^N y_i & 0 & 0 & N & 0 \\ 0 & \sum_{i=1}^N z_i & 0 & 0 & N \end{bmatrix} \begin{bmatrix} w \\ h \\ t_x \\ t_y \\ t_z \end{bmatrix} = \begin{bmatrix} \sum_{i=1}^N (x_i \overline{x}_i + y_i \overline{y}_i) \\ \sum_{i=1}^N z_i \overline{z}_i \\ \sum_{i=1}^N \overline{x}_i \\ \sum_{i=1}^N \overline{y}_i \\ \sum_{i=1}^N \overline{z}_i \end{bmatrix} \quad (7)$$

where $x = [x, y, z]^T$, $\overline{x} = [\overline{x}, \overline{y}, \overline{z}]^T$ and the estimated $S = \text{diag}[w, w, h]$, $T = [t_x, t_y, t_z]$. Steps 1204-1208 are only performed once. Steps 1202, 1210 and 1212 are iterated until the change of the parameters is below a threshold determined by the working resolution. After the convergence of the algorithm, the prototypes $\{\overline{P}_j\}_{j=1}^M$ of all of the shapes and their local coordinate transformations $\{R_j, S_j, T_j\}_{j=1}^M$ are used to cut the multiple slices.

Figure 5:
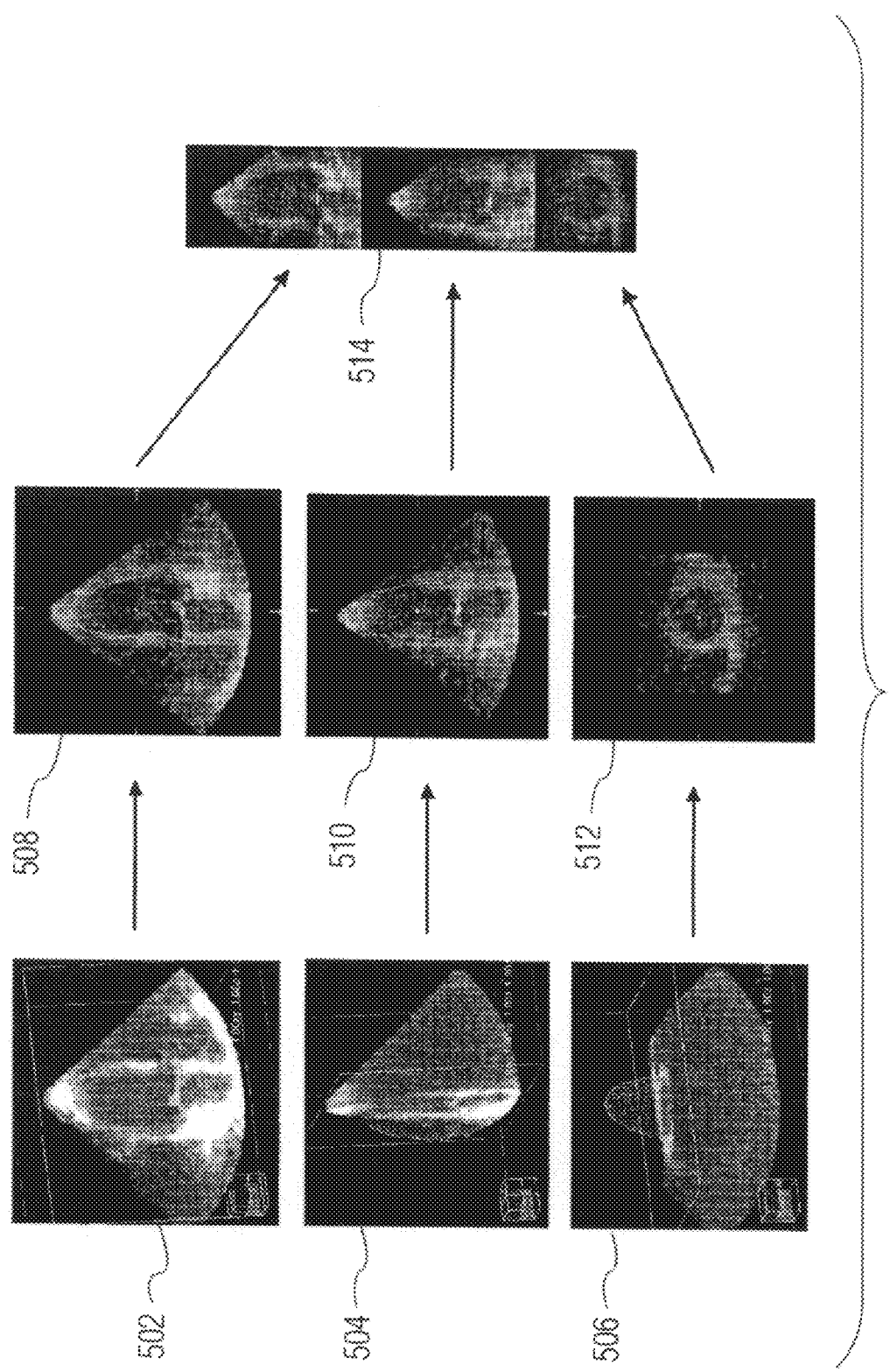
FIG. 5 illustrates how two slices of a 3D image along the principal axis and one slice of a 3D image orthogonal to the principal axis are used to build a joint image in accordance with the present invention.

In accordance with the present invention, the detection method is based on a boosted cascade of simple features. To avoid the difficulty in dealing with 3D data directly, the 3D data is represented by 2D slices that are simultaneously cut from the volume. The slices should be perpendicular to the surface of the shape in order to make the slices sensitive to the changing of the shape. For a volume in the training set, the translation, rotation, and scale of the mesh are all known. As such, m vertical slices can be cut along the principal axis of the mesh and n horizontal slices are cut orthogonal to the principal axis of the mesh. For each shape, its prototype is cut into vertical slices through the z-axis at different angles from the x-z plane and cut horizontal slices at different z. For example in FIG. 5, m=2 and n=1. There are two vertical slices at 0 and 90 degrees from the x-z plane and one horizontal slice at z=0. These three slices are sufficient for detection purposes because any changes in the location, orientation or aspect ratio will cause large changes in at least one slice, since the slices coincide with the three coordinate axes. As shown in FIG. 5, vertical slices along the principal axis are taken of 3D images 502, 504 to form 2D slices 508, 510. Likewise, a horizontal slice orthogonal to the principal axis is taken of 3D image 506 to form 2D slice 512. The images are then joined to form images 514.

Figure 6:
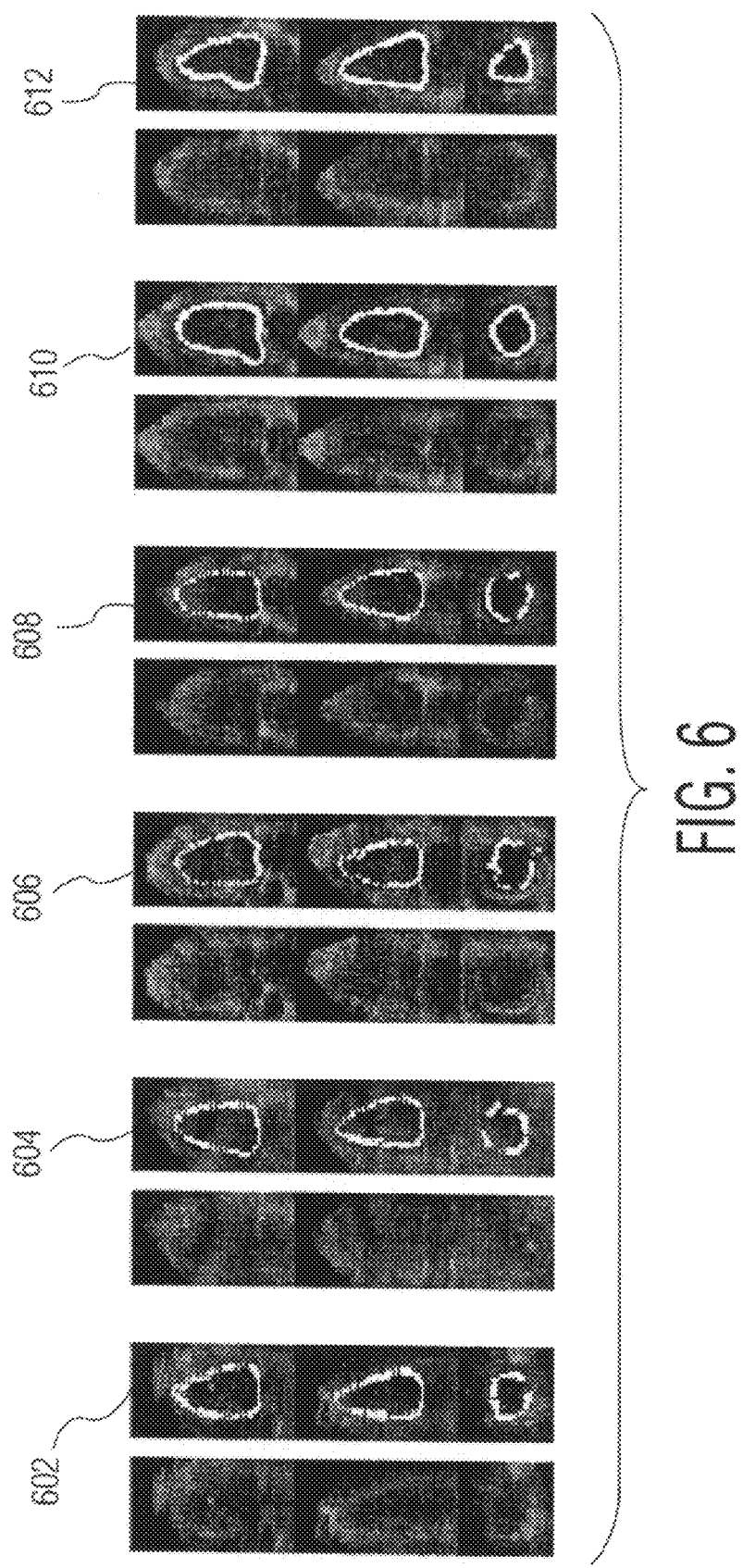
FIG. 6 illustrates a set of positive training samples in accordance with the present invention.
Figure 7:
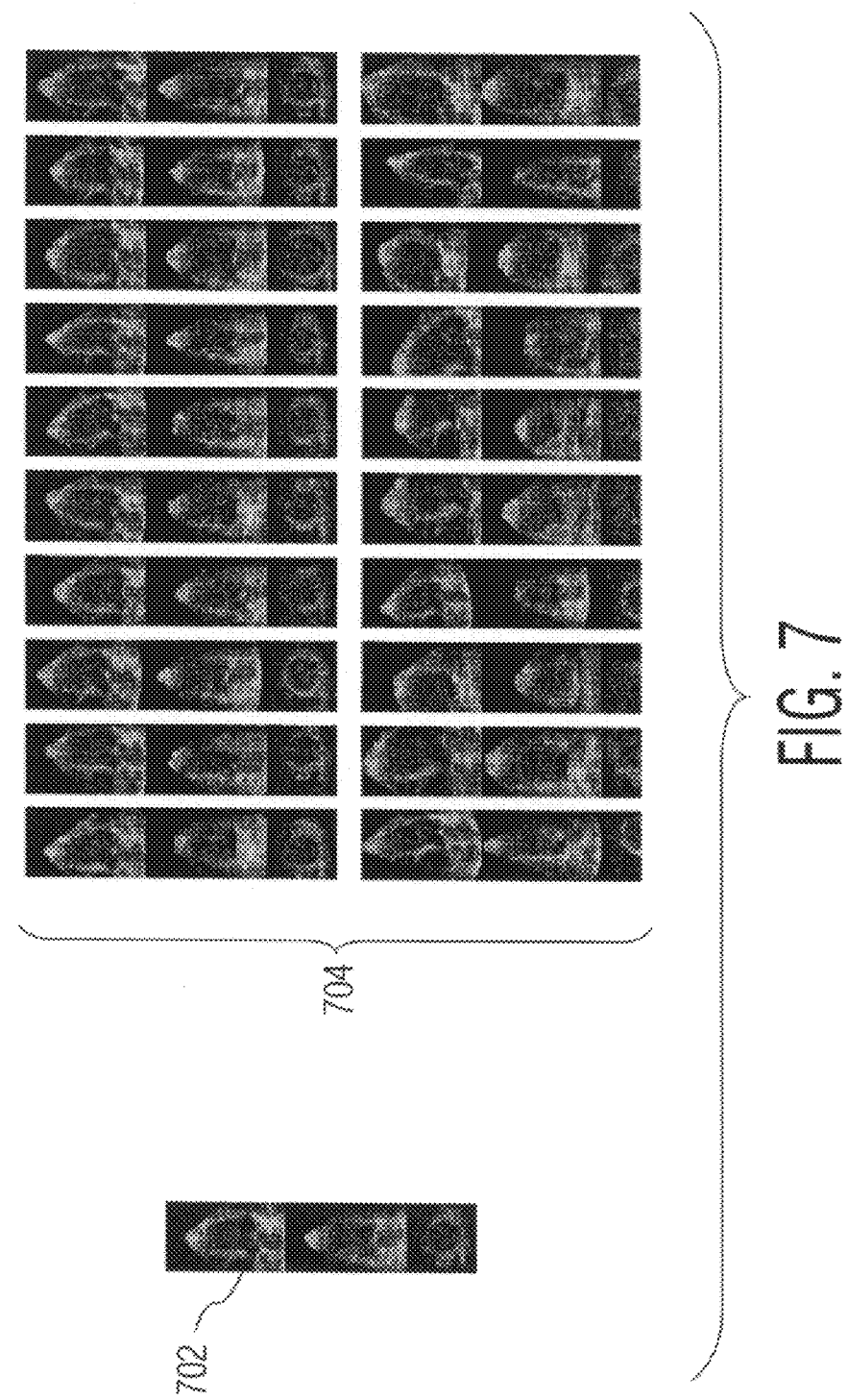
FIG. 7 illustrates a positive training sample and a set of negative training samples in accordance with the present invention.

Positive training samples as shown in FIG. 6 are acquired for all the volumes in the training set. The positive samples are acquired from slices obtained in local coordinates from the transformations. There are two columns for each sample 602-612. The left column of each sample 602-612 shows the slices and the right column of each sample 602-612 shows the slices with the mesh plotted on. The multiple slices capture the variations of the 3D shapes. Some perturbation is added to the correct transformation to generate negative samples. FIG. 7 illustrates a comparison of a positive training sample 702 versus a set of negative training samples 704. The negative training samples 704 are obtained by using incorrect transformation parameters.

Figure 8:
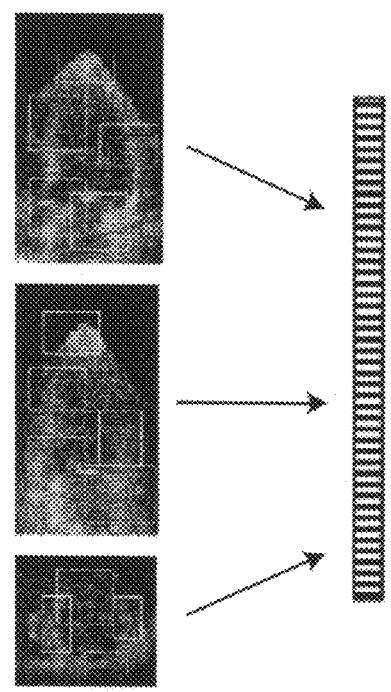
FIG. 8 illustrates how features from all of the slices obtained from a volumetric image are used simultaneously for training in accordance with the present invention.

Rectangular Haar-like features are used for training because they can be computed quickly by integral images. In accordance with the present invention, features from all of the image slices are obtained simultaneously as shown in FIG. 8. Features from all the 2D slices comprise the feature vector for the 3D volume. The integral image is adopted to accelerate the computation of the features. The integral mask is used to ensure correct computation for invalid image regions. Adaboosting is then used to select the best features for the classifier.

The detection of a 3D shape is equivalent to finding the correct transformation between world coordinates and local coordinates of the object. The transformation is determined by R, S and T which contain 8 transformation parameters $[\omega_x, \omega_y, \omega_z, w, h, t_x, t_y, t_z]$, where $\omega_x$, $\omega_y$ and $\omega_z$ are three Euler angles. Exhaustive searching in an 8 dimensional space would be very time-consuming. In the left ventricle detection problem, the A4C plane (i.e., the x-z plane of local coordinates) is usually easily annotated by human or other automatic detection. It is assumed that the A4C plane is known so that a search only needs to be performed inside the A4C plane.

For the searching initialization, a user provides an A4C plane. This plane is denoted by the normal vector of the plane n, and any one point on the plane p. The equation of this plane will be, $$n^T(x-p)=0 \quad (3)$$

The search needs to start from an initial transform $R_0$, $S_0$ and $T_0$. The initial rotation will be determined by making the y-axis as the normal of the A4C plane.

$$R_0 = [v_1, v_2, v_3] \quad (4)$$

where $v_2 = n$, let $u = \begin{bmatrix} 0 \\ 0 \\ 1 \end{bmatrix}$, $v_1 = v_2 \times u$, $v_3 = v_1 \times v_2$.

$T_m$ is the mean of T for all training samples. It is a good initial guess but may not be on the A4C plane. It is projected onto the A4C plane to get the initial translation.

$$T_0 = T_m + n \cdot n^T(p - T_m) \quad (5)$$

$S_m$ is the mean of S for all training samples where $S_0 = S_m$.

During the search the initial transformation is changed by another relative transformation. Since the transformation inside the A4C plane needs to be fixed, the only possible relative rotation is along the y-axis.

$$Rr = \begin{bmatrix} \cos\omega_{ry} & 0 & \sin\omega_{ry} \\ 0 & 1 & 0 \\ -\sin\omega_{ry} & 0 & \cos\omega_{ry} \end{bmatrix} \quad (6)$$

The relative translation $T_r = [t_{rx}, 0, t_{rz}]^T$ is a translation on the A4C plane. It is defined on the coordinates in the A4C plane because the y component of $T_r$ is 0 on this coordinate. The relative scale matrix is $$S_r = \begin{bmatrix} w_r & 0 & 0 \\ 0 & w_r & 0 \\ 0 & 0 & h_r \end{bmatrix} \quad (7)$$

where $w_r$ is the changing of the width and $h_r$ is the changing of the height. So the overall transformation from the normalized model to the volume is:

$$x = RSx_0 + T = R_0R_r((S_0+S_r)x_0 + T_r) + T_0 = R_0R_r(S_0+S_r)x_0 + R_0R_rT_r + T_0, \; R = R_0R_r, S = S_0+S_r, T = R_0R_rT_r + T_0 = RT_r + T_0 \quad (8)$$

Figure 9:
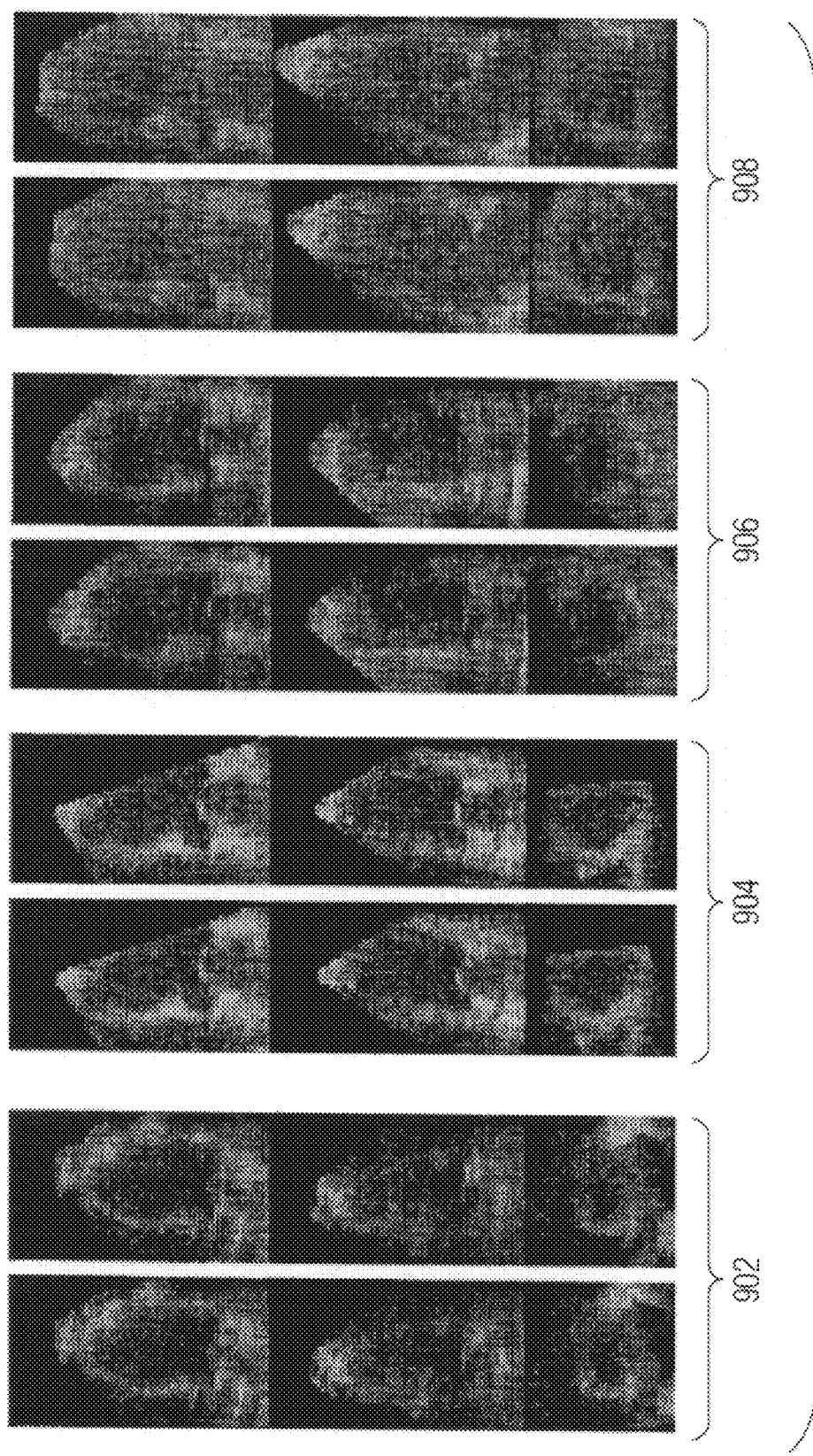
FIG. 9 illustrates some detection results for the transformation of the anatomical object in accordance with the present invention.

Now there are 5 parameters $[\omega_{ry}, w_r, h_r, t_{rx}, t_{rz}]$ An exhaustive 5-D search is done within a range. For example, $\theta=[-30,\ldots,30] \; x_r=[-30,\ldots,30] \; z_r=[-30,\ldots,30]$
$w_r=[-30,\ldots,30] \; h_r=[-30,\ldots,30]$ The searching is performed in a coarse to fine fashion. In the coarse stage, the search range is determined by the statistics of the training data. After finding the maximum response of the detection classifier, a new iteration of searching will be performed. The initial point will be located at the maximum response found in the coarse stage and the search range will be reduced by half. FIG. 9 illustrates some examples of detection results. Two columns of slices 902-908 are shown for each sample. The left columns of each pair show the ground truth and the right columns for each pair shows the detected anatomical structure.

Figure 10:
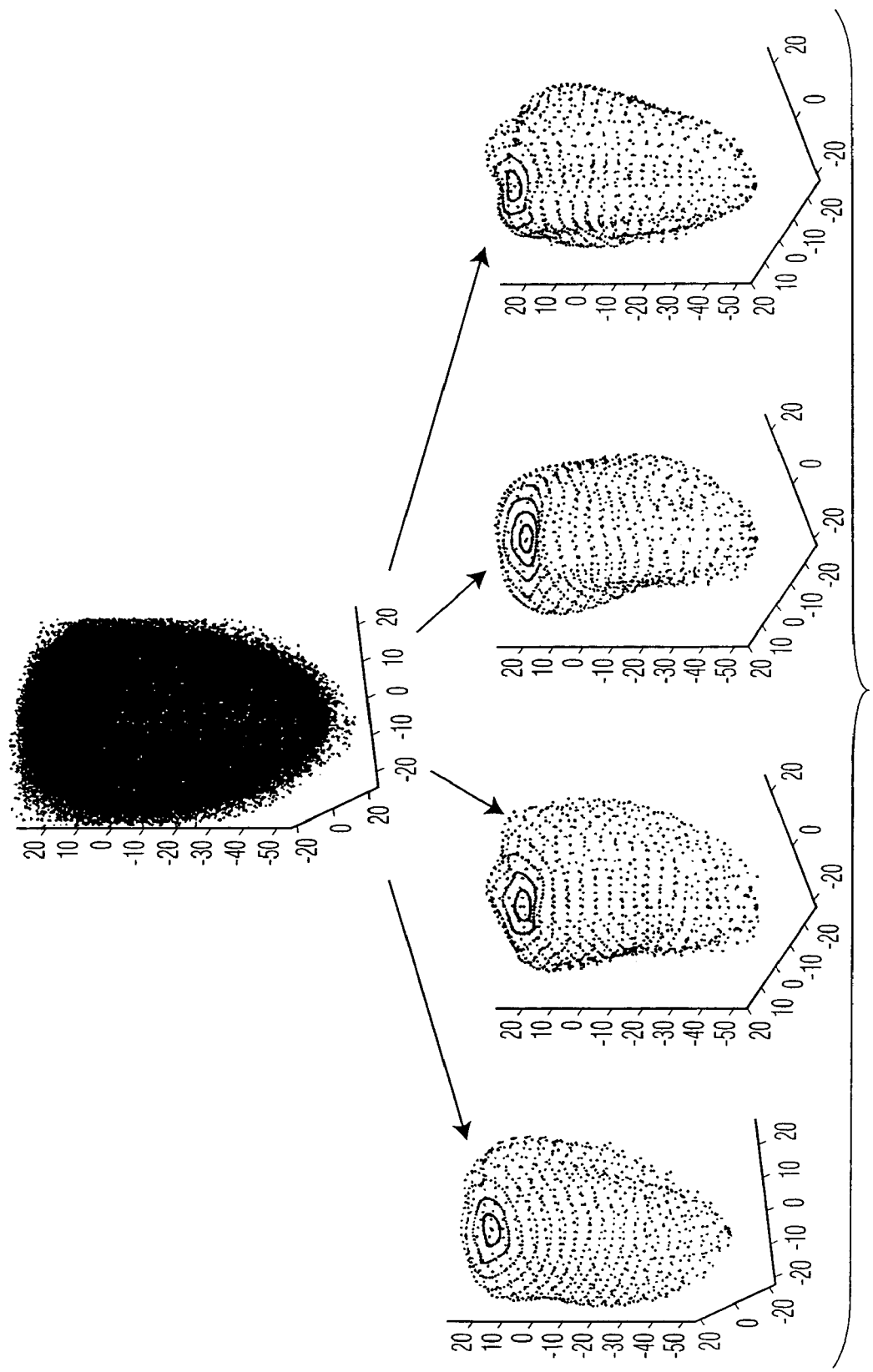
FIG. 10 illustrates how the shapes of all of the meshes are clustered into K classes in accordance with the present invention.
Figure 11:
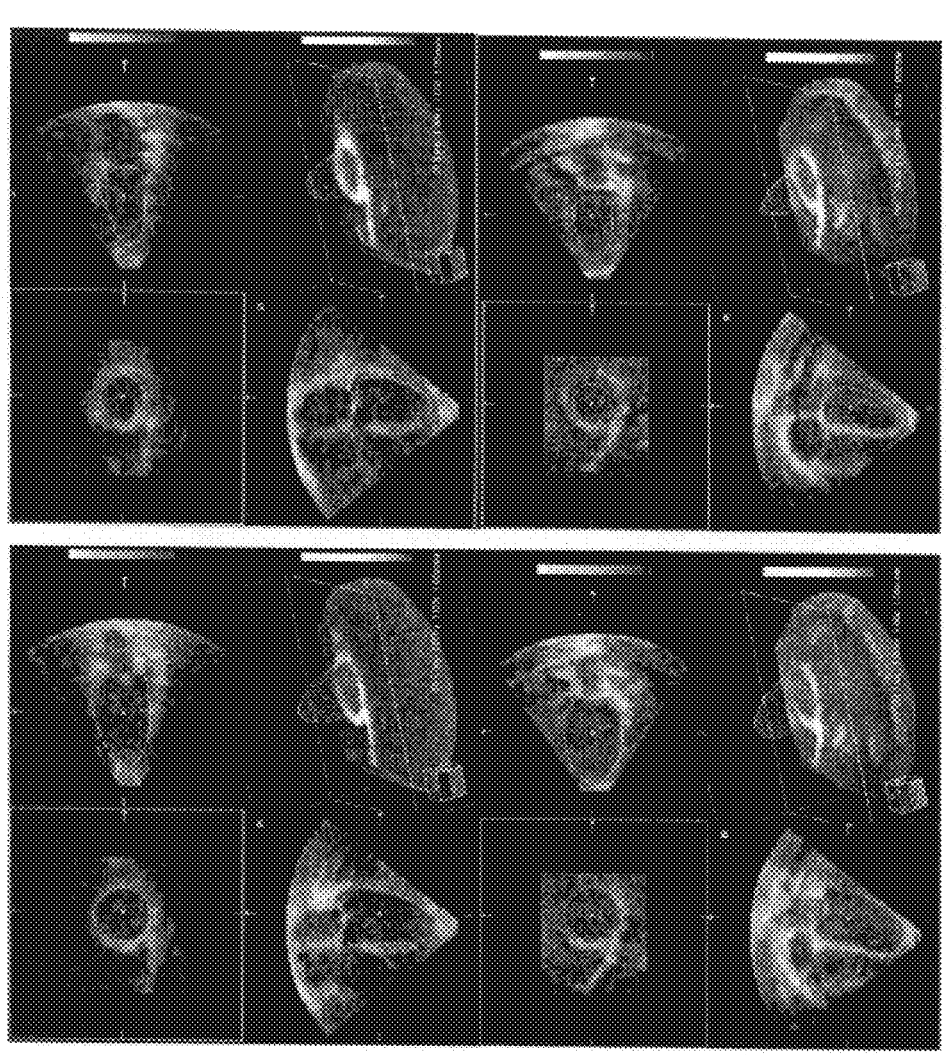
FIG. 11 illustrates some shape inference results in accordance with the present invention.
Figure 13:
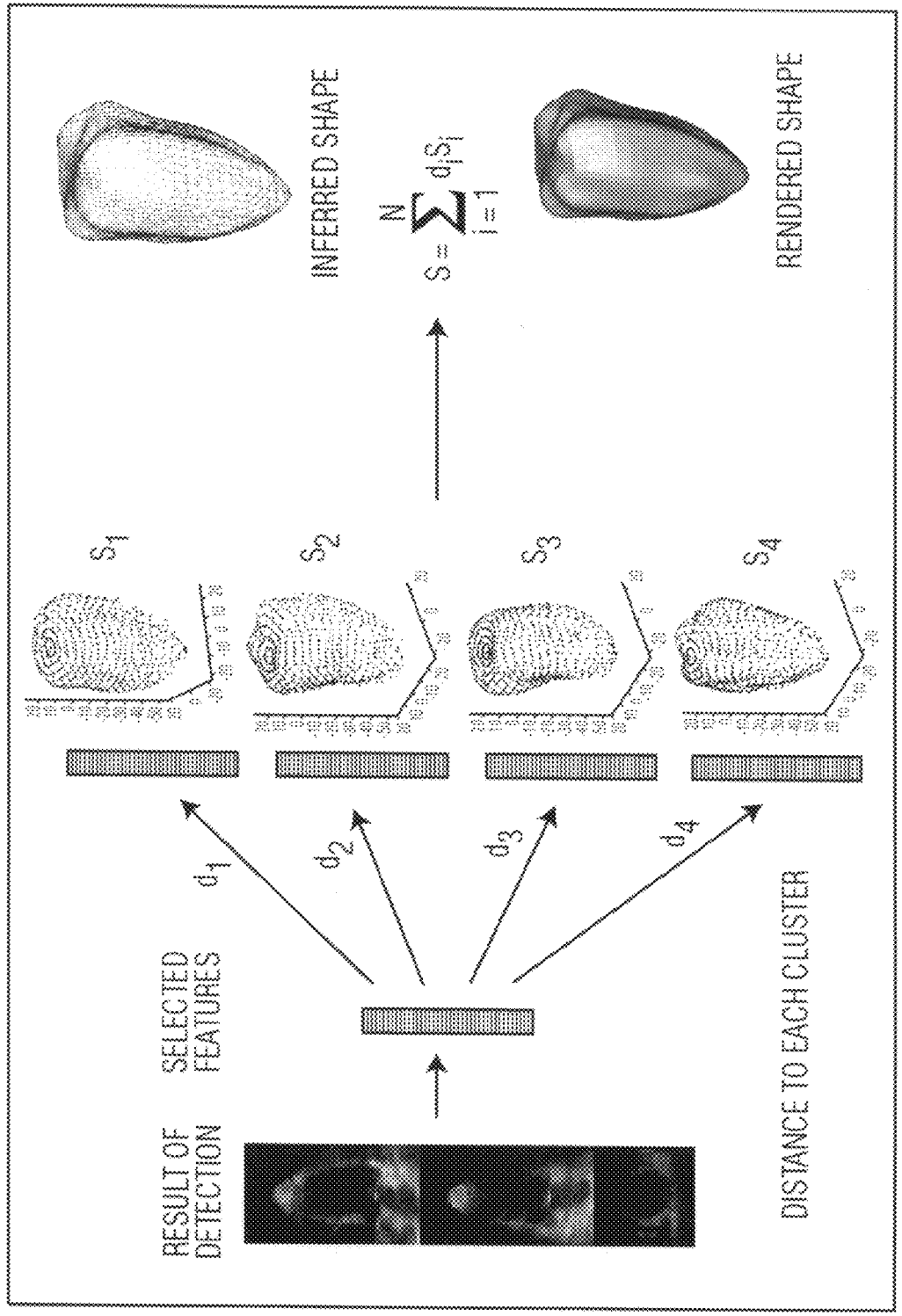
FIG. 13 is an overview of the shape inference method in accordance with the present invention.

Next, the shape associated with the detected object is determined. An overview of the shape inference process is shown in FIG. 13. The shapes of all of the meshes are clustered into K classes as shown in FIG. 10. The best features that discriminate these classes of shapes will be selected by the forward sequential feature selection. The distance of the query and a reference is $$d(f_q, f_r) = (f_q - f_r)^T \Sigma (f_q - f_r) \qquad (9)$$

where $f_q$ and $f_r$ are the feature vector of the query and the reference respectively. The discriminating matrix is represented by $\Sigma$. The inferred shape $\hat{c}$ is computed by the Nadaraya-Watson kernel-weighted average $$\hat{c}(f) = \frac{\sum_{i=1}^{N} K_k(f, f) c_i}{\sum_{i=1}^{N} K_k(f, f_i)} \qquad (10)$$

where $c_i$ is the $i^{th}$ sample of N prototypes. $K_k$ is the Epanechnikov quadratic kernel. FIG. 11 shows some shape inference results in accordance with the present invention.

Having described embodiments for a method for database-guided simultaneous multi-slice object detection in three dimensional (3D) volumetric data, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A computer implemented method for automatic detection and segmentation of a target anatomical structure in received three dimensional (3D) volumetric medical images using a database of a set of volumetric images with expertly delineated anatomical structures, the method performed by the computer comprising the steps of:

training a 3D anatomical structure detection and segmentation module offline by learning anatomical structure appearance using the set of expertly delineated anatomical structures;

detecting online an anatomical structure of interest in a received volumetric image by defining a transformation between coordinates of said structure of interest and world coordinates;

clustering said set of expertly delineated anatomical structures into a plurality of shape classes;

selecting those features that best discriminate between the classes of shapes; and determining a shape of said structure of interest by computing a kernel weighted average over the expertly delineated anatomical structures, wherein said kernel is a function of selected feature values of the expertly delineated anatomical structures and the structure of interest;

wherein said steps of training a 3D anatomical structure detection and segmentation module, detecting an anatomical structure of interest, clustering the expertly delineated anatomical structures, selecting features, and determining a shape are performed by a computer processor.

2. The method of claim 1 wherein the step of offline training further comprises the steps of:

annotating each anatomical structure in the training set with 3D meshes;

creating a shape model for each anatomical structure using the 3D meshes;

representing the appearance of each anatomical structure as a plurality of two dimensional (2D) slices simultaneously cut directly from the volumetric image, including vertical slices cut through a vertical axis at different angles and horizontal slices cut through different points on the vertical axis;

simultaneously computing features from each of the 2D slices associated with a given anatomical structure;

learning a structure detector by selecting representative features that correspond to an anatomical structure of interest relative to other anatomical locations; and selecting the representative features that associates the anatomical structure of interest with its corresponding 3D shape mesh.

3. The method of claim 2 wherein the step of creating a shape model further comprising the steps of:

aligning each 3D mesh to a mean shape;

normalizing the mean shape into a unit size bounding box; and scaling the meshes.

4. The method of claim 3 wherein the step of aligning each 3D mesh further comprises the steps of:

rotating each mesh so that its principal axis is aligned to a z axis; and translating and scaling each mesh so that a distance among all of the meshes is minimized.

5. The method of claim 2 wherein the step of learning a structure detector further comprises the step of:

selecting representative features using discriminative boosting learning techniques.

6. The method of claim 2 wherein the step of selecting the representative features that correspond to the 3D shape mesh further comprises the steps of:

clustering all of the 3D meshes into a predetermined number of clusters; and identifying features that best discriminate between different classes of shapes.

7. The method of claim 1, wherein defining a transformation between coordinates of said structure of interest and world coordinates comprises:

providing a representative plane in said structure of interest in said volumetric image whose world coordinates are known;

determining an initial rotation $R_0$ by defining a vector normal to the representative plane to be an axis of the local coordinate system of the structure of interest;

determining an initial translation $T_0$ by projecting a mean translation of all expertly delineated anatomical structures onto the representative plane;

determining an initial scaling $S_0$ from a mean of the scaling of all expertly delineated anatomical structures; and performing a 5D search for 5 parameters that define a rotation $R_r$, translation $T_r$, and scaling $S_r$ within said representative plane, wherein rotations and translations are restricted to be in the representative plane, by iteratively seeking parameter values that maximize a response of said 3D anatomical structure detection module, wherein said 5 parameters are a rotation angle in the representative plane, a 2D translation in the representative plane, and wherein 2 of 3 scaling components are set equal to each other, wherein said transformation is represented as $R_0 R_r ((S_0 + S_r) x_0 + T_r) + T_0$.

8. The method of claim 7, wherein said 5D parameter search is performed in a coarse to fine manner, wherein a search range for the coarse stage is determined by statistics of the expertly delineated anatomical structures, and an initial point of the fine stage is located at a point of maximum response found in the coarse stage wherein said search range is reduced by a predetermined amount.

9. A program storage device readable by a computer, tangibly embodying a program of instructions executable by the computer to perform the method steps for automatic detection and segmentation of a target anatomical structure in received three dimensional (3D) volumetric medical images using a database of a set of volumetric images with expertly delineated anatomical structures, the method comprising the steps of:

training a 3D anatomical structure detection and segmentation module offline by learning anatomical structure appearance using the set of expertly delineated anatomical structures;

detecting online an anatomical structure of interest in a received volumetric image by defining a transformation between coordinates of said structure of interest and world coordinates;

clustering said set of expertly delineated anatomical structures into a plurality of shape classes;

selecting those features that best discriminate between the classes of shapes; and determining a shape of said structure of interest by computing a kernel weighted average over the expertly delineated anatomical structures, wherein said kernel is a function of selected feature values of the expertly delineated anatomical structures and the structure of interest;

wherein said steps of training a 3D anatomical structure detection and segmentation module, detecting an anatomical structure of interest, clustering the expertly delineated anatomical structures, selecting features, and determining a shape are performed by a computer processor.

10. The computer readable program storage device of claim 9, wherein the step of offline training further comprises the steps of:

annotating each anatomical structure in the training set with 3D meshes;

creating a shape model for each anatomical structure using the 3D meshes;

representing the appearance of each anatomical structure as a plurality of two dimensional (2D) slices simultaneously cut directly from the volumetric image, including vertical slices cut through a vertical axis at different angles and horizontal slices cut through different points on the vertical axis;

simultaneously computing features from each of the 2D slices associated with a given anatomical structure;

learning a structure detector by selecting representative features that correspond to an anatomical structure of interest relative to other anatomical locations; and selecting the representative features that associates the anatomical structure of interest with its corresponding 3D shape mesh.

11. The computer readable program storage device of claim 10, wherein the step of creating a shape model further comprising the steps of:

aligning each 3D mesh to a mean shape;

normalizing the mean shape into a unit size bounding box; and scaling the meshes.

12. The computer readable program storage device of claim 11, wherein the step of aligning each 3D mesh further comprises the steps of:

rotating each mesh so that its principal axis is aligned to a z axis; and translating and scaling each mesh so that a distance among all of the meshes is minimized.

13. The computer readable program storage device of claim 10, wherein the step of learning a structure detector further comprises the step of:

selecting representative features using discriminative boosting learning techniques.

14. The computer readable program storage device of claim 10, wherein the step of selecting the representative features that correspond to the 3D shape mesh further comprises the steps of:

clustering all of the 3D meshes into a predetermined number of clusters; and identifying features that best discriminate between different classes of shapes.

15. The computer readable program storage device of claim 9, wherein defining a transformation between coordinates of said structure of interest and world coordinates comprises:

providing a representative plane in said structure of interest in said volumetric image whose world coordinates are known;

determining an initial rotation $R_0$ by defining a vector normal to the representative plane to be an axis of the local coordinate system of the structure of interest;

determining an initial translation $T_0$ by projecting a mean translation of all expertly delineated anatomical structures onto the representative plane;

determining an initial scaling $S_0$ from a mean of the scaling of all expertly delineated anatomical structures; and performing a SD search for 5 parameters that define a rotation $R_r$, translation $T_r$, and scaling $S_r$ within said representative plane, wherein rotations and translations are restricted to be in the representative plane, by iteratively seeking parameter values that maximize a response of said 3D anatomical structure detection module, wherein said 5 parameters are a rotation angle in the representative plane, a 2D translation in the representative plane, and wherein 2 of 3 scaling components are set equal to each other, wherein said transformation is represented as $R_0 R_r((S_0+S_r)x_0+T_r)+T_0$.

16. The computer readable program storage device of claim 15, wherein said 5D parameter search is performed in a coarse to fine manner, wherein a search range for the coarse stage is determined by statistics of the expertly delineated anatomical structures, and an initial point of the fine stage is located at a point of maximum response found in the coarse stage wherein said search range is reduced by a predetermined amount.

17. A computer implemented method for automatic detection and segmentation of a target anatomical structure in received three dimensional (3D) volumetric medical images using a database of a set of volumetric images with expertly delineated anatomical structures, the method performed by the computer comprising the steps of:

providing a training set of M 3D volumes of a structure of interest that are expertly annotated as 3D meshes, each mesh represented by a set of N points;

aligning the meshes to a mean shape;

normalizing the mean shape into a unit size bounding box and scaling all meshes accordingly;

cutting each volume into vertical slices through a vertical axis at different angles and cutting horizontal slices at different points on the vertical axis;

obtaining features from the image slices;

using boosting to select the best features for the 3D structure detection and segmentation module; and searching online a received volumetric image for the anatomical structure of interest using the offline learned 3D anatomical structure detection and segmentation module, wherein said steps of aligning meshes, normalizing the mean shape, cutting each volume, obtaining features, using boosting, and searching a received volume are performed by a computer processor.

18. The method of claim 17, wherein aligning the meshes comprises:

rotating each mesh to align its principal axis to the vertical axis;

translating and scaling each mesh to minimize an $L_2$ distance among all the meshes, wherein the distance between two shapes $P_1$, $P_2$ is $$dist(P_1, P_2) = \sum_{i=1}^{N} \|x_i^1 - x_i^2\|,$$

said meshes are aligned by finding a mean shape $\overline{P}$, a rotation matrix $R_j$, a scaling matrix $S_j$, and a translation vector $T_j$ from among all rotation and scaling matrices and translation vectors that minimize $$\sum_{j=1}^{M} dist(P_j, \overline{P}) = \sum_{j=1}^{M} \sum_{i=1}^{N} \|x_i^j - \overline{x}_i\|,$$

wherein $P_j$ is a training mesh.

19. The method of claim 18, wherein minimizing $$\sum_{j=1}^{M} \sum_{i=1}^{N} \|x_i^j - \overline{x}_i\|$$

comprises:

aligning, for each mesh, the principal axis which links two apexes to the vertical axis;

rotating each mesh along its principal axis so that a representative plane of the structure of interest matches a plane through the vertical axis and orthogonal to a horizontal plane;

defining a coordinate system centered on the centroid of each mesh;

calculating the mean shape $\overline{P}$ as $\overline{P} = 1/M \Sigma P_j$; and solving, for each shape, the equation $$\begin{bmatrix} \sum_{i=1}^{N}(x_i^2 + y_i^2) & 0 & \sum_{i=1}^{N}(x_i + y_i) & 0 & 0 \\ 0 & \sum_{i=1}^{N} z_i^2 & 0 & 0 & \sum_{i=1}^{N} z_i \\ \sum_{i=1}^{N} x_i & 0 & N & 0 & 0 \\ \sum_{i=1}^{N} y_i & 0 & 0 & N & 0 \\ 0 & \sum_{i=1}^{N} z_i & 0 & 0 & N \end{bmatrix} \begin{bmatrix} w \\ h \\ t_x \\ t_y \\ t_z \end{bmatrix} = \begin{bmatrix} \sum_{i=1}^{N}(x_i \overline{x}_i + y_i \overline{y}_i) \\ \sum_{i=1}^{N} z_i \overline{z}_i \\ \sum_{i=1}^{N} \overline{x}_i \\ \sum_{i=1}^{N} \overline{y}_i \\ \sum_{i=1}^{N} \overline{z}_i \end{bmatrix},$$

wherein $x=[x, y, z]^T$ is a point on the mesh, $\overline{x}=[\overline{x},\overline{y},\overline{z}]^T$ is a point on the mean shape, an estimated scaling matrix is $S=\text{diag}[w, w, h]$, and an estimated translation vector is $T=[t_x, t_y, t_z]$.

20. The method of claim 17, wherein searching online a received volumetric image for the anatomical structure of interest comprises:

detecting online an anatomical structure of interest in a received volumetric image by defining a transformation between coordinates of said structure of interest and world coordinates;

clustering said set of expertly delineated anatomical structures into a plurality of shape classes;

selecting those features that best discriminate between the classes of shapes; and determining a shape of said structure of interest by computing a kernel weighted average over the expertly delineated anatomical structures, wherein said kernel is a function of selected feature values of the expertly delineated anatomical structures and the structure of interest.

* * * * *